United States Patent
Hsiao et al.

(10) Patent No.: US 12,449,630 B2
(45) Date of Patent: Oct. 21, 2025

(54) OPTICAL SYSTEM

(71) Applicant: TDK TAIWAN CORP., Taoyuan (TW)

(72) Inventors: Yi-Cheng Hsiao, Taoyuan (TW); Chao-Chang Hu, Taoyuan (TW); Che-Wei Chang, Taoyuan (TW); Chen-Hsien Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 698 days.

(21) Appl. No.: 17/739,369

(22) Filed: May 9, 2022

(65) Prior Publication Data

US 2022/0357543 A1    Nov. 10, 2022

Related U.S. Application Data

(60) Provisional application No. 63/186,496, filed on May 10, 2021.

(51) Int. Cl.
*G02B 7/08* (2021.01)
*G02B 7/00* (2021.01)
(Continued)

(52) U.S. Cl.
CPC .............. *G02B 7/08* (2013.01); *G02B 7/005* (2013.01); *G02B 7/021* (2013.01); *G02B 7/022* (2013.01);
(Continued)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08;
(Continued)

(56) References Cited

U.S. PATENT DOCUMENTS

| | | | |
|---|---|---|---|
| 11,256,059 B2 * | 2/2022 | Wu | G02B 7/023 |
| 2021/0199912 A1 * | 7/2021 | Hu | G02B 7/20 |
| 2022/0357556 A1 * | 11/2022 | Hsiao | G02B 7/022 |

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical system is provided in the present disclosure, including a first movable portion, a fixed portion, a first driving assembly, and a circuit assembly. The first movable portion is connected to a first optical element. The first movable portion is movable relative to the fixed portion. The first driving assembly drives the first movable portion to move relative to the fixed portion. The circuit assembly is electrically connected to the first driving assembly.

19 Claims, 10 Drawing Sheets

(51) Int. Cl.
*G02B 7/02* (2021.01)
*G02B 7/09* (2021.01)
*G02B 15/14* (2006.01)
*G02B 27/64* (2006.01)
*G03B 3/10* (2021.01)
*G03B 5/02* (2021.01)
*H04N 23/54* (2023.01)
*H04N 23/55* (2023.01)

(52) U.S. Cl.
CPC ............... *G02B 7/023* (2013.01); *G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search
CPC .............. G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092
See application file for complete search history.

OPTICAL SYSTEM

CROSS REFERENCE TO RELATED APPLICATIONS

This application claims the benefit of U.S. Provisional Application No. 63/186,496, filed May 10, 2021, the entirety of which is incorporated by reference herein.

BACKGROUND OF THE INVENTION

Field of the Invention

The present disclosure is related to an optical system, and more particularly to an optical system with optical elements that can be adjusted with precision.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable to provide optical qualities that are better and more stable, offering consumers more choice.

Electronic devices that have image-capturing or video-recording functions normally include one or more lenses, thereby performing such functions as auto focus (AF), zooming, and/or optical image stabilization (OIS). Therefore, an optical system usually includes a plurality of driving assemblies for driving the optical elements to move and a plurality of sensing assemblies for sensing the positions of the optical elements. However, it is common for a driving assembly and a sensing assembly to each have at least one magnetic element. Within a limited volume, there may be magnetic interference among multiple magnetic elements. As a result, the present disclosure provides an optical system that is different from the prior art, it can precisely adjust the positions of the optical elements and maintain its stability.

BRIEF SUMMARY OF THE INVENTION

In one embodiment of the present disclosure, an optical system is provided in the present disclosure, including a first movable portion, a fixed portion, a first driving assembly, and a circuit assembly. The first movable portion is connected to a first optical element. The first movable portion is movable relative to the fixed portion. The first driving assembly drives the first movable portion to move relative to the fixed portion. The circuit assembly is electrically connected to the first driving assembly.

In some embodiments, the optical system further includes a second movable portion and a second driving assembly. The second movable portion is connected to a second optical element. The second movable portion is movable relative to the fixed portion and the first movable portion. The first movable portion and the second movable portion are arranged in a first direction. The second driving assembly drives the second movable portion to move relative to the fixed portion.

In some embodiments, the first movable portion is movable within a first range of motion relative to the fixed portion. The second movable portion is movable within a second range of motion relative to the fixed portion. The second range of motion is different from the first range of motion. The second movable portion is movable within a third range of motion relative to the first movable portion.

In some embodiments, the first movable portion includes a first holder with a plastic material, a first guiding portion with a plastic material and a first connection portion with a metal material. The first holder corresponds to the first driving assembly. The second movable portion is movable relative to the first movable portion through the first guiding portion. The first holder is fixedly connected to the first guiding portion via the first connecting portion. The second movable portion includes a second holder with a plastic material, a second guiding portion with a plastic material and a second connection portion with a metal material. The second holder corresponds to the second driving assembly. The second movable portion is movable relative to the second movable portion through the second guiding portion. The second holder is fixedly connected to the second guiding portion via the second connecting portion.

In some embodiments, the first connecting portion is at least partially embedded in the first holder and at least partially embedded in the first guiding portion. The second connecting portion is at least partially embedded in the second holder and at least partially embedded in the second guiding portion.

In some embodiments, the first optical element is fixedly connected to the first holder via a first adhesive, and is fixedly connected to the first guiding portion via a second adhesive. The second optical element is fixedly connected to the second holder via a third adhesive, and is fixedly connected to the second guiding portion via a fourth adhesive.

In some embodiments, when viewed in the first direction, the first holder at least partially overlaps the second guiding portion, and the second holder at least partially overlaps the first guiding portion.

In some embodiments, the first driving assembly is at least partially disposed at the first holder. The first driving assembly includes a first magnetic element and a first coil. The first magnetic element is fixedly disposed on the first holder. The first coil corresponds to the first magnetic element, and is disposed on the fixed portion. A first axis of the first coil is parallel to the first direction. The second driving assembly is at least partially disposed at the second holder. The second driving assembly includes a second magnetic element and a second coil. The second magnetic element is fixedly disposed on the second holder. The second coil corresponds to the second magnetic element, and is disposed on the fixed portion. A second axis of the second coil is parallel to the first direction.

In some embodiments, when viewed in a second direction that is perpendicular to the first direction, the first driving assembly at least partially overlaps the second driving assembly.

In some embodiments, when viewed in a third direction that is perpendicular to the first direction and the second direction, a center of the first magnetic element and a center of the second magnetic element form a first line. The first line is neither parallel nor perpendicular to the first direction. A center of the first coil and a center of the second coil form a second line. The second line is neither parallel nor perpendicular to the first direction.

In some embodiments, the optical system further includes a first sensing assembly and a second sensing assembly. The first sensing assembly senses the movement of the first movable portion relative to the fixed portion. The first sensing assembly includes a first reference magnetic element and a first sensor. The first reference magnetic element includes a plurality of first magnetic pole pairs that have N poles and S poles. The first magnetic pole pairs are arranged in the first direction. In each of the first magnetic pole pairs, an N pole and an S pole are arranged in a first magnetic pole direction. The first magnetic pole direction is perpendicular to the first direction. The first sensor corresponds to the first reference magnetic element. The second sensing assembly senses the movement of the second movable portion relative to the fixed portion. The second sensing assembly includes a second reference magnetic element and a second sensor. The second reference magnetic element includes a plurality of second magnetic pole pairs that have N poles and S poles. The second magnetic pole pairs are arranged in the first direction. In each of the second magnetic pole pairs, an N pole and an S pole are arranged in a second magnetic pole direction. The second magnetic pole direction is perpendicular to the first direction. The second sensor corresponds to the second reference magnetic element.

In some embodiments, when viewed in the first magnetic pole direction, the first reference magnetic element at least partially overlaps the first sensor. When viewed in the second magnetic pole direction, the second reference magnetic element at least partially overlaps the second sensor.

In some embodiments, the first magnetic pole direction is parallel to the second magnetic pole direction.

In some embodiments, a third magnetic pole direction of the first magnetic element is parallel to a fourth magnetic pole direction of the second magnetic element.

In some embodiments, the first magnetic pole direction is not parallel to the third magnetic pole direction. The first magnetic pole direction is not parallel to the fourth magnetic pole direction. The second magnetic pole direction is not parallel to the third magnetic pole direction. The second magnetic pole direction is not parallel to the fourth magnetic pole direction.

In some embodiments, the first magnetic pole direction is perpendicular to the third magnetic pole direction. The first magnetic pole direction is perpendicular to the fourth magnetic pole direction. The second magnetic pole direction is perpendicular to the third magnetic pole direction. The second magnetic pole direction is perpendicular to the fourth magnetic pole direction.

In some embodiments, the optical system further includes a control unit. The control unit has first predetermined information and second predetermined information. The first predetermined information includes the status of a first magnetic field of the first reference magnetic element for each possible location of the first movable portion relative to the fixed portion. The second predetermined information includes the status of a second magnetic field of the second reference magnetic element for each possible location of the second movable portion relative to the fixed portion. The control unit is electrically connected to the first sensor and the second sensor via the circuit assembly. The first sensor outputs a first sensing signal to the control unit, and the second sensor outputs a second sensing signal to the control unit.

In some embodiments, the control unit calculates the position of the first movable portion relative to the fixed portion based on the first sensing signal and the first predetermined information, and calculates the position of the second movable portion relative to the fixed portion based on the second sensing signal and the second predetermined information.

In some embodiments, the optical system further includes a third optical element. The third optical element is fixedly disposed at the fixed portion, and forms an optical unit with the first optical element and the second optical element. The control unit outputs a first driving signal to the first driving assembly based on a first instruction. The first driving assembly drives the first movable portion to move, and changes the focal length of the optical unit, thereby performing the function of zooming. The control unit outputs a second driving signal to the second driving assembly based on a second instruction. The second driving assembly drives the second movable portion to move, and changes the image plane of the optical unit, thereby performing the function of focusing.

In some embodiments, the control unit outputs the first driving signal to the first driving assembly that drives the first movable portion to move before the control unit outputs the second driving signal to the second driving assembly that drives the second movable portion to move, so that the optical system performs the function of zooming before performing the function of focusing.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion. The various embodiments are described with reference to the attached figures, where like reference numerals are used throughout the figures to designate similar or equivalent elements.

DETAILED DESCRIPTION OF THE INVENTION

Figure 1:
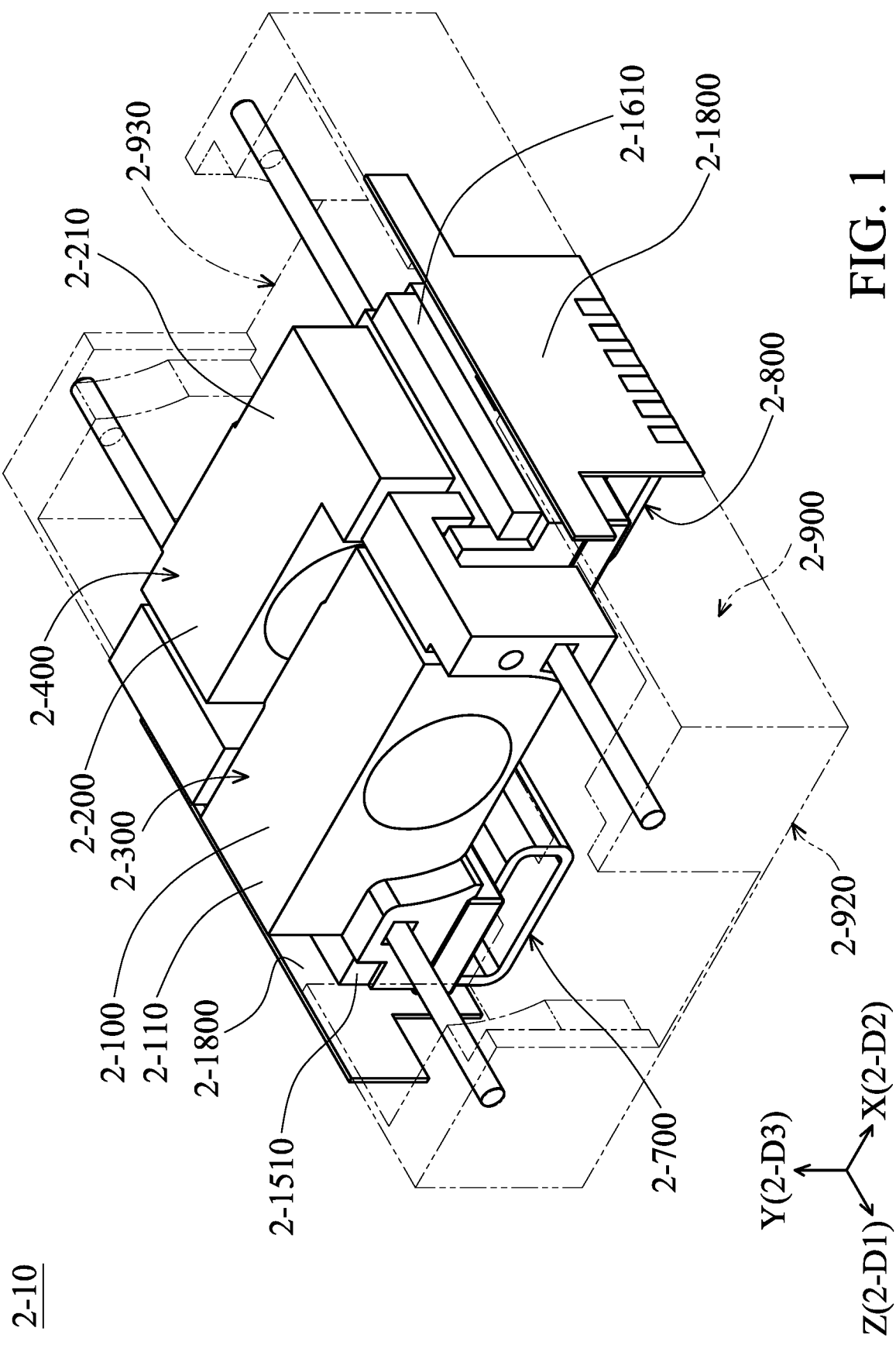
FIG. 1 is a perspective view of the optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. In some embodiments, each of the optical elements in the optical system is connected to a movable portion. Each movable portion is driven to move by a driving assembly (e.g. including a magnetic element and a coil). The position of the movable portion is sensed by a sensing assembly (e.g. including a reference magnetic element and a sensor). In the optical system provided in the present disclosure, the configuration of the driving assemblies and the sensing assemblies prevents the magnetic interference among them, thereby achieving good driving effects and sensing effects, which improves the optical quality of the optical system.

Referring to FIG. 1, FIG. 1 is a perspective view of the optical system 2-10, according to some embodiments of the present disclosure. As shown in FIG. 1, the optical system 2-10 mainly includes a first optical element 2-100, a second optical element 2-200, a first movable portion 2-300, a second movable portion 2-400, a first driving assembly 2-700, a second driving assembly 2-800, a fixed portion 2-900, and a circuit assembly 2-1800. In some embodiments, the first optical element 2-100 and the second optical element 2-200 may each include one or more lenses, forming individual lens groups. In some specific embodiments, the first optical element 2-100 is for optical zooming, and the second optical element 2-200 is for optical focusing. Of course, the functions of the first optical element 2-100 and the second optical element 2-200 may be adjusted or exchanged based on requirements of users. In the embodiment shown in FIG. 1, the first optical element 2-100 is connected to the first movable portion 2-300. The first movable portion 2-300 and the first optical element 2-100 are driven by the first driving assembly 2-700 to move relative to the fixed portion 2-900. Similarly, the second optical element 2-200 is connected to the second movable portion 2-400. The second movable portion 2-400 and the second optical element 2-200 are driven by the second driving assembly 2-800 to move relative to the fixed portion 2-900. It should be noted that the second movable portion 2-400 is movable relative to the first movable portion 2-300, which will be described in details below.

Figure 2:
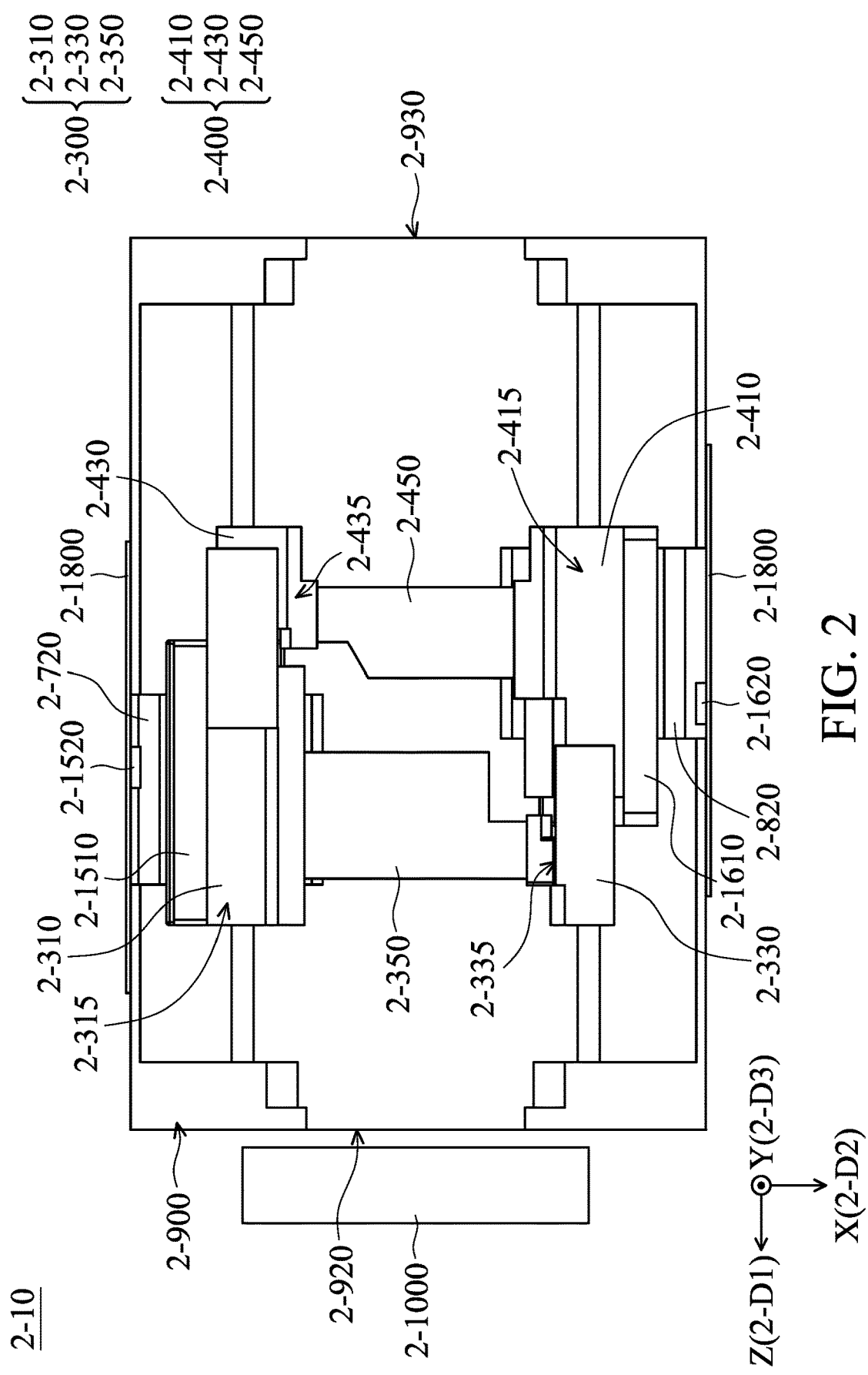
FIG. 2 is a top view of the optical system, according to some embodiments of the present disclosure, wherein the first optical element and the second optical element are omitted.

Next, referring to FIG. 1 and FIG. 2, FIG. 2 is a top view of the optical system 2-10, according to some embodiments of the present disclosure, wherein the first optical element 2-100 and the second optical element 2-200 are omitted. As shown in FIG. 2, the first movable portion 2-300 and the second movable portion 2-400 are arranged in the first direction 2-D1. In the embodiments of the present disclosure, the first direction 2-D1 is parallel to the Z direction in the figures. The first movable portion 2-300 includes a first holder 2-310, a first guiding portion 2-330, and a first connecting portion 2-350. In some embodiments, the first holder 2-310 may have a plastic material, and correspond and connect to the first driving assembly 2-700. The first holder 2-310 is movably connected to the fixed portion 2-900, so that the first movable portion 2-300 is movable relative to the fixed portion 2-900. The first guiding portion 2-330 may have a plastic material, and is movably connected to the second movable portion 2-400. The second movable portion 2-400 is movable relative to the first movable portion 2-300 through the first guiding portion 2-330. The first connecting portion 2-350 may have a magnetic permeable material (e.g. a metal material). The first holder 2-310 is fixedly connected to the first guiding portion 2-330 via the first connecting portion 2-350, forming the first movable portion 2-300 that is movable together relative to the fixed portion 2-900. In some embodiments, a first connection strengthening portion (e.g. the surface facing the first optical element 2-100) of the first holder 2-310 has a first adherent surface 2-315 that corresponds to the first extension 2-110 of the first optical element 2-100 (see FIG. 1). The first extension 2-110 is fixedly connected to the first holder 2-310 via a first adhesive. In some embodiments, the first guiding portion 2-330 has a second adherent surface 2-335 that corresponds to the opposite side of the first optical element 2-100 from the first extension 2-110. The first guiding portion 2-330 is in direct contact with the first optical element 2-100. The first optical element 2-100 is fixedly connected to the first guiding portion 2-330 via a second adhesive. In some embodiments, the largest size of the first holder 2-310 in the first direction 2-D1 is larger than the largest size of the first guiding portion 2-330 in the first direction 2-D1. In some embodiments, the first adhesive and the second adhesive are the same. In some other embodiments, the first adhesive and the second adhesive are different.

Similarly, the second movable portion 2-400 includes a second holder 2-410, a second guiding portion 2-430, and a second connecting portion 2-450. In some embodiments, the second holder 2-410 may have a plastic material, and correspond and connect to the second driving assembly 2-800. The second holder 2-410 is movably connected to the fixed portion 2-900, so that the second movable portion 2-400 is movable relative to the fixed portion 2-900. The second guiding portion 2-430 may have a plastic material, and is movably connected to the first movable portion 2-300. The second movable portion 2-400 is movable relative to the first movable portion 2-300 through the second guiding portion 2-430. The second connecting portion 2-450 may have a magnetic permeable material (e.g. a metal material). The second holder 2-410 is fixedly connected to the second guiding portion 2-430 via the second connecting portion 2-450, forming the second movable portion 2-400 that is movable together relative to the fixed portion 2-900 and the first movable portion 2-300. In some embodiments, a second connection strengthening portion (e.g. the surface facing the second optical element 2-200) of the second holder 2-410 has a third adherent surface 2-415 that corresponds to the second extension 2-210 of the second optical element 2-200 (see FIG. 1). The second extension 2-210 is fixedly connected to the second holder 2-410 via a third adhesive. In some embodiments, the second guiding portion 2-430 has a fourth adherent surface 2-435 that corresponds to the opposite side of the second optical element 2-200 from the second extension 2-210. The second guiding portion 2-430 is in direct contact with the second optical element 2-200. The second optical element 2-200 is fixedly connected to the second guiding portion 2-430 via a fourth adhesive. In some embodiments, the largest size of the second holder 2-410 in the first direction 2-D1 is larger than the largest size of the second guiding portion 2-430 in the first direction 2-D1. In some embodiments, the third adhesive and the fourth adhesive are the same. In some other embodiments, the third adhesive and the fourth adhesive are different.

In addition, according to some embodiments of the present disclosure, the fixed portion 2-900 includes a light entrance 2-920 and a light exit 2-930. Lights enter the optical system 2-10 through the light entrance 2-920, and leave the optical system 2-10 through the light exit 2-930. In some embodiments, the optical system 2-10 further includes a third optical element 2-1000. The third optical element 2-1000 may include one or more lenses, forming an individual lens group. The third optical element 2-1000 may be fixedly disposed at the fixed portion 2-900. In the embodiment shown in FIG. 2, the third optical element 2-1000 is disposed on the side where the light entrance 2-920 of the fixed portion 2-900 is. However, in some other embodiments, the third optical element 2-1000 may also be disposed on the side where the light exit 2-930 is. Alternatively, one third optical element 2-1000 may be disposed respectively on the light entrance 2-920 and on the light exit 2-930. The third optical element 2-1000 may form an optical unit with the first optical element 2-100 and the second optical element 2-200, for determining the optical effects of the optical system 2-10.

Figure 3:
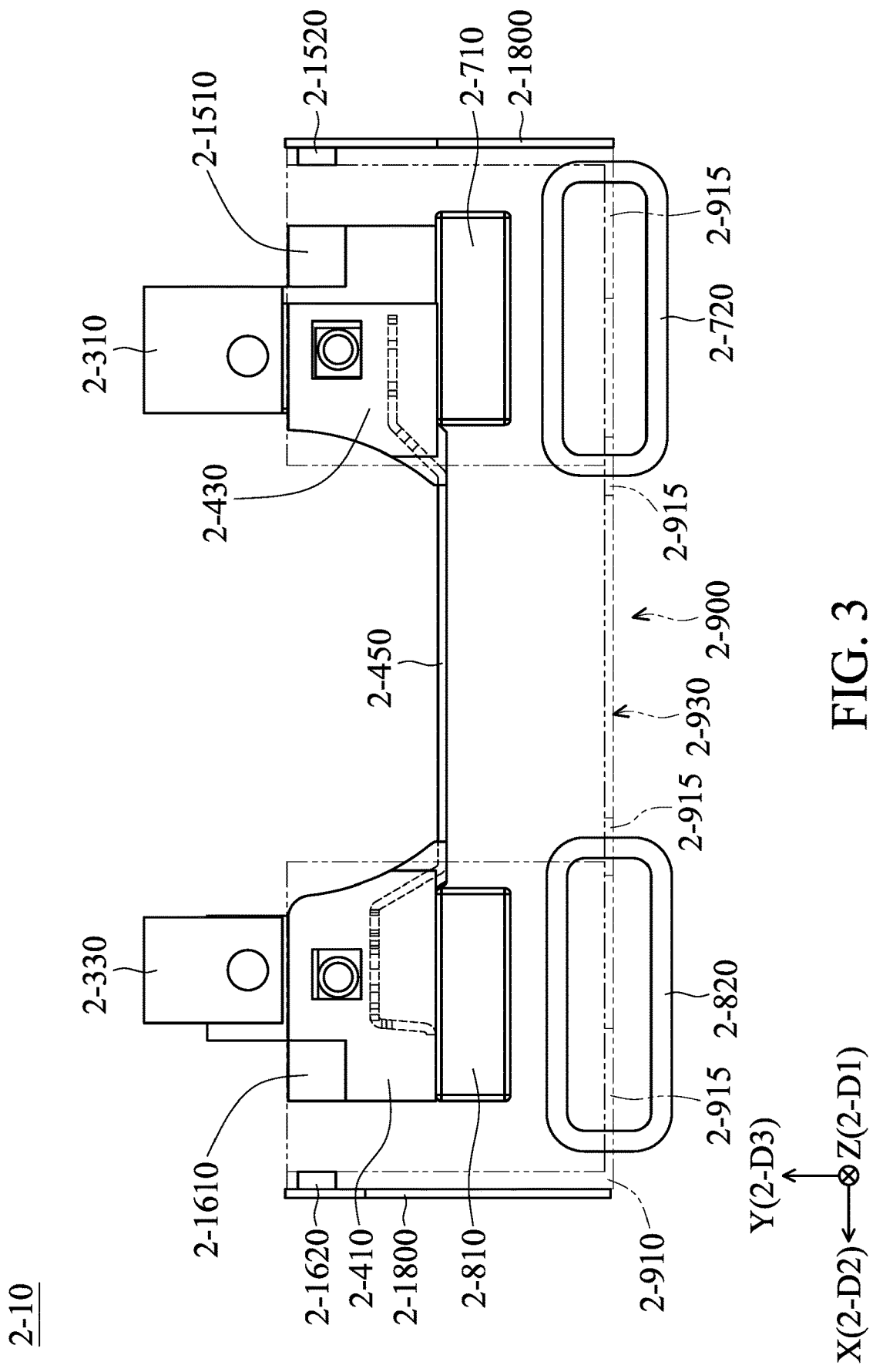
FIG. 3 is a right side view of the optical system, according to some embodiments of the present disclosure, wherein the first optical element and the second optical element are omitted.

Referring to FIG. 3, FIG. 3 is a right side view of the optical system 2-10, according to some embodiments of the present disclosure, wherein the first optical element 2-100 and the second optical element 2-200 are omitted. In some embodiments, when viewed in the first direction 2-D1 (i.e. in the view angle of FIG. 3), the first holder 2-310 and the second guiding portion 2-430 at least partially overlap, and the second holder 2-410 and the first guiding portion 2-330 at least partially overlap. In addition, as shown in FIG. 3, the second connecting portion 2-450 of the second movable portion 2-400 has a plate structure, and it is at least partially embedded in the second holder 2-410 and at least partially embedded in the second guiding portion 2-430. In the embodiment shown in FIG. 3, the embedded portions of the second connecting portion 2-450 have bent structures that may strengthen the connections with the second holder 2-410 and with the second guiding portion 2-430. However, the second connecting portion 2-450 may have any suitable shapes, it is not limited to the embodiment illustrated in the present disclosure. Similarly, the first connecting portion 2-350 of the first movable portion 2-300 has similar structures as the second connecting portion 2-450. The first connecting portion 2-350 is at least partially embedded in the first holder 2-310 and at least partially embedded in the first guiding portion 2-330.

In the present disclosure, the first movable portion 2-300 and the second movable portion 2-400 are movable in the first direction 2-D1 relative to the fixed portion 2-900. Referring back to FIG. 2, when the first movable portion 2-300 moves to the left until the first holder 2-310 is in contact with the fixed portion 2-900, the first movable portion 2-300 is at a first terminal position; when the first movable portion 2-300 carries the second movable portion 2-400 to move to the right together until the second holder 2-410 is in contact with the fixed portion 2-900, and the first movable portion 2-300 keeps moving to the right until the first guiding portion 2-330 is in contact with the second holder 2-410, the first movable portion 2-300 is at a second terminal position. The range of motion for the first movable portion 2-300 between the first terminal position and the second terminal position is defined as the first range of motion. The first movable portion 2-300 is movable relative to the fixed portion 2-900 within the first range of motion. When the first movable portion 2-300 is at the first terminal position, and the second movable portion 2-400 keeps moving to the left until the second guiding portion 2-430 is in contact with the first holder 2-310, the second movable portion 2-400 is at a third terminal position; when the first movable portion 2-300 carries the second movable portion 2-400 to move to the right together until the second holder 2-410 is in contact with the fixed portion 2-900, the second movable portion 2-400 is at a fourth terminal position. The range of motion for the second movable portion 2-400 between the third terminal position and the fourth terminal position is defined as the second range of motion. The second movable portion 2-400 is movable relative to the fixed portion 2-900 within the second range of motion. The first range of motion and the second range of motion are different. In some embodiments of the present disclosure, the second movable portion 2-400 is movable relative to the first movable portion 2-300. When the second movable portion 2-400 moves to the left relative to the first movable portion 2-300 until the second holder 2-410 is in contact with the first guiding portion 2-330, the second movable portion 2-400 is at a fifth terminal position; when the second movable portion 2-400 moves to the right relative to the first movable portion 2-300 until the first holder 2-310 is in contact with the second guiding portion 2-430, the second movable portion 2-400 is at a sixth terminal position. The range of motion for the second movable portion 2-400 between the fifth terminal position and the sixth terminal position is defined as the third range of motion. The second movable portion 2-400 is movable relative to the first movable portion 2-300 within the third range of motion. In some embodiments, the first range of motion is smaller than the second range of motion, and the third range of motion is smaller than the first range of motion.

Figure 4:
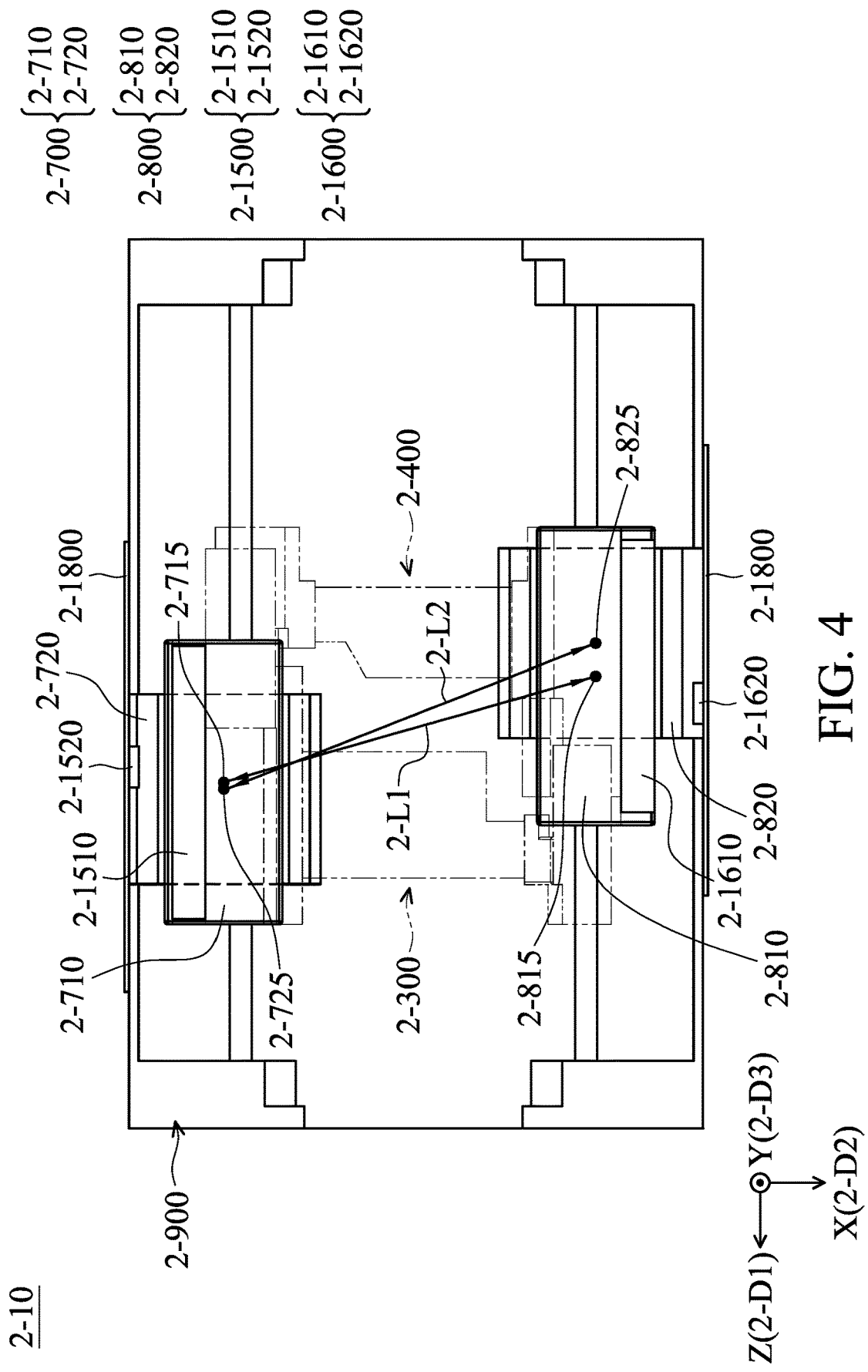
FIG. 4 is a top view of the optical system, according to some embodiments of the present disclosure, wherein the first optical element, the second optical element, the first movable portion, and the second movable portion are omitted.
Figure 5:
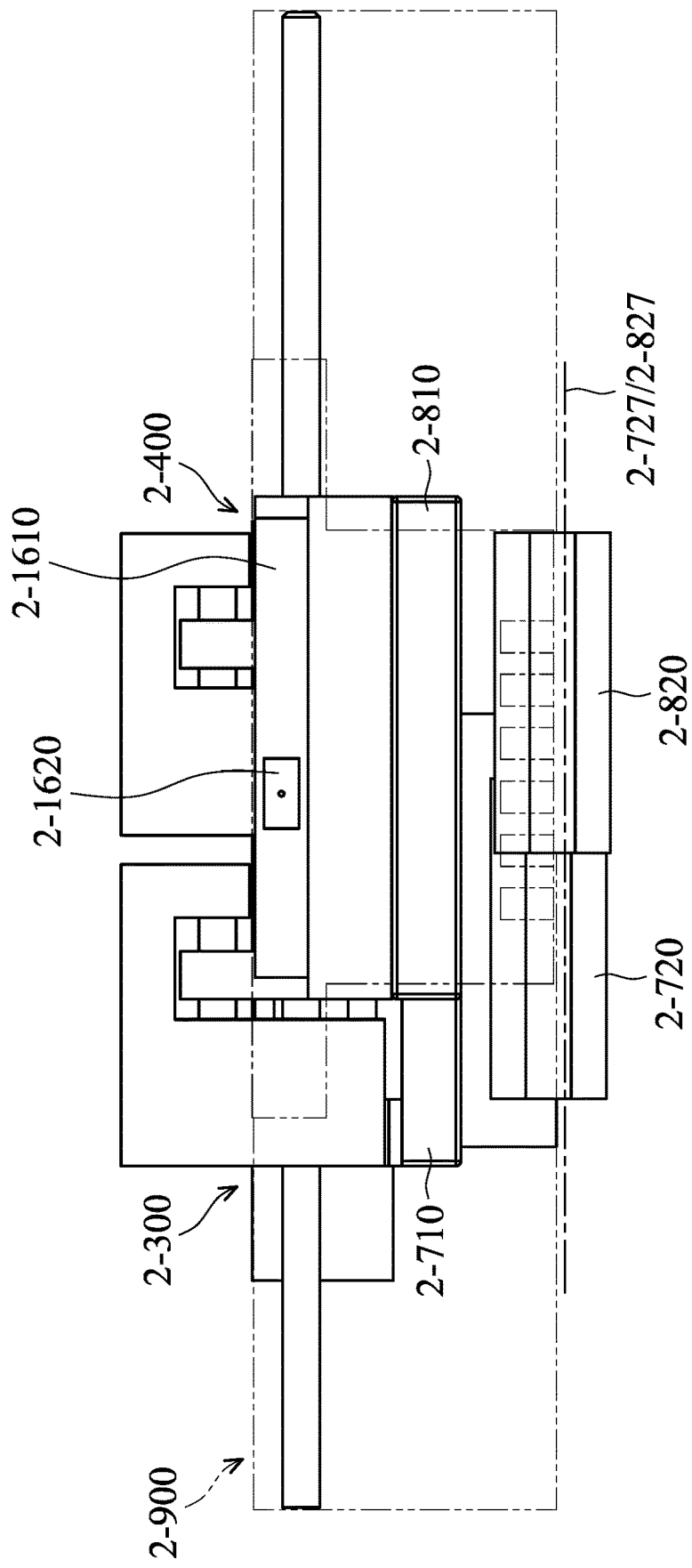
FIG. 5 is a front view of the optical system, according to some embodiments of the present disclosure.

Next, referring to FIG. 1 to FIG. 5, FIG. 4 is a top view of the optical system 2-10, according to some embodiments of the present disclosure, wherein the first optical element 2-100, the second optical element 2-200, the first movable portion 2-300, and the second movable portion 2-400 are omitted. FIG. 5 is a front view of the optical system 2-10, according to some embodiments of the present disclosure. As shown in FIG. 4, the first driving assembly 2-700 is at least partially disposed at the first holder 2-310, electrically connected to the circuit assembly 2-1800, and includes a first magnetic element 2-710 and a first coil 2-720. In some embodiments, the first magnetic element 2-710 is fixedly disposed at the first holder 2-310, and located at the opposite side from the first adherent surface 2-315 (see FIG. 2). The first coil 2-720 corresponds to the first magnetic element 2-710, and is disposed at the fixed portion 2-900. The first coil 2-720 has a first axis 2-727 (see FIG. 5). The direction that the first axis 2-727 extends in is parallel to the first direction 2-D1. The first movable portion 2-300 is driven to move relative to the fixed portion 2-900 by the electromagnetic driving force generated between the first magnetic element 2-710 and the first coil 2-720. Similarly, the second driving assembly 2-800 is at least partially disposed at the second holder 2-410, electrically connected to the circuit assembly 2-1800, and includes a second magnetic element 2-810 and a second coil 2-820. In some embodiments, the second magnetic element 2-810 is fixedly disposed at the second holder 2-410, and located at the opposite side from the third adherent surface 2-415 (see FIG. 2). The second coil 2-820 corresponds to the second magnetic element 2-810, and is disposed at the fixed portion 2-900. The second coil 2-820 has a second axis 2-827 (see FIG. 5). The direction that the second axis 2-827 extends in is parallel to the first direction 2-D1. The second movable portion 2-400 is driven to move relative to the fixed portion 2-900 by the electromagnetic driving force generated between the second magnetic element 2-810 and the second coil 2-820.

When viewed in the second direction 2-D2 (X direction) (FIG. 5), the first driving assembly 2-700 and the second driving assembly 2-800 at least partially overlap. For example, the first magnetic element 2-710 and the second magnetic element 2-810 at least partially overlap. Alternatively, the first coil 2-720 and the second coil 2-820 at least partially overlap. In addition, as shown in FIG. 5, when viewed in the second direction 2-D2, the first magnetic element 2-710 does not overlap the first coil 2-720, and the second magnetic element 2-810 does not overlap the second coil 2-820. In some embodiments, due to different ranges of movement of the first movable portion 2-300 and the second movable portion 2-400, the largest size of the first magnetic element 2-710 in the first direction 2-D1 is different from the largest size of the second magnetic element 2-810 in the first direction 2-D1. In some specific embodiments, the largest size of the first magnetic element 2-710 in the first direction 2-D1 is smaller than the largest size of the second magnetic element 2-810 in the first direction 2-D1. In some embodiments, the largest size of the first coil 2-720 in the first direction 2-D1 (or the extending direction of the first axis 2-727) is the same as the largest size of the second coil 2-820 in the first direction 2-D1.

When viewed in the third direction 2-D3 (Y direction) (FIG. 4), the first magnetic element 2-710 has a center 2-715, the first coil 2-720 has a center 2-725, the second magnetic element 2-810 has a center 2-815, and the second coil 2-820 has a center 2-825. The center 2-715 and the center 2-815 form a first line 2-L1. The first line 2-L1 is neither parallel nor perpendicular to the first direction 2-D1.

The center 2-725 and the center 2-825 form a second line 2-L2. The second line 2-L2 is neither parallel nor perpendicular to the first direction 2-D1.

As shown in FIG. 3, in some embodiments, the fixed portion 2-900 includes a frame 2-910. The first optical element 2-100, the second optical element 2-200, the first movable portion 2-300, and the second movable portion 2-400 are all disposed within the frame 2-910. The first coil 2-720 and the second coil 2-820 are fixedly disposed at the frame 2-910. In the embodiment shown in FIG. 3, the frame 2-910 has a plurality of openings 2-915. The first coil 2-720 and the second coil 2-820 may go through the openings 2-915, and protrude from the frame 2-910. As shown in FIG. 3, the openings 2-915 may have any suitable sizes. For example, the two outer openings 2-915 may be bigger, and the two inner openings 2-915 may be smaller. In some embodiments, the frame 2-910 has a magnetic permeable material. In some specific embodiments, the frame 2-910 is made of a metal material.

In some embodiments according to the present disclosure, the optical system 2-10 further includes a first sensing assembly 2-1500 and a second sensing assembly 2-1600. The first sensing assembly 2-1500 is for sensing the movement of the first movable portion 2-300 relative to the fixed portion 2-900, and the second sensing assembly 2-1600 is for sensing the movement of the second movable portion 2-400 relative to the fixed portion 2-900. The first sensing assembly 2-1500 and the second sensing assembly 2-1600 may be any suitable position sensing assemblies, such as a Hall sensor, a Tunneling Magnetoresistance (TMR) effect sensor, a Giant Magnetoresistance (GMR) effect sensor, or any magnetic sensors.

Figure 6:
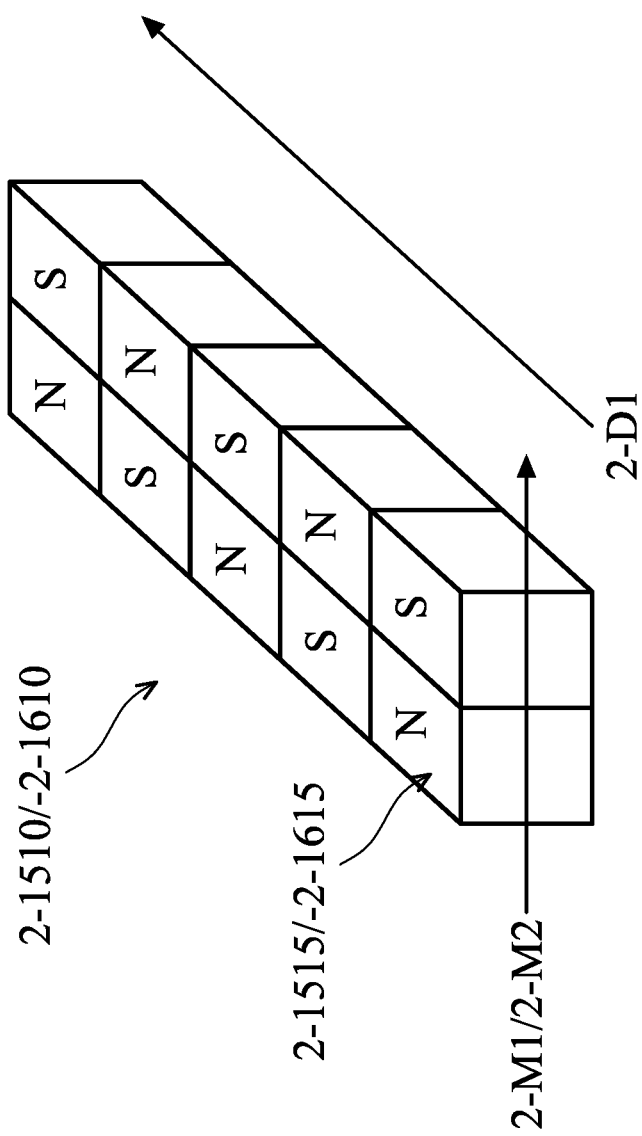
FIG. 6 is a schematic view of the structures of the first reference magnetic element and the second reference magnetic element, according to some embodiments of the present disclosure.
Figure 7:
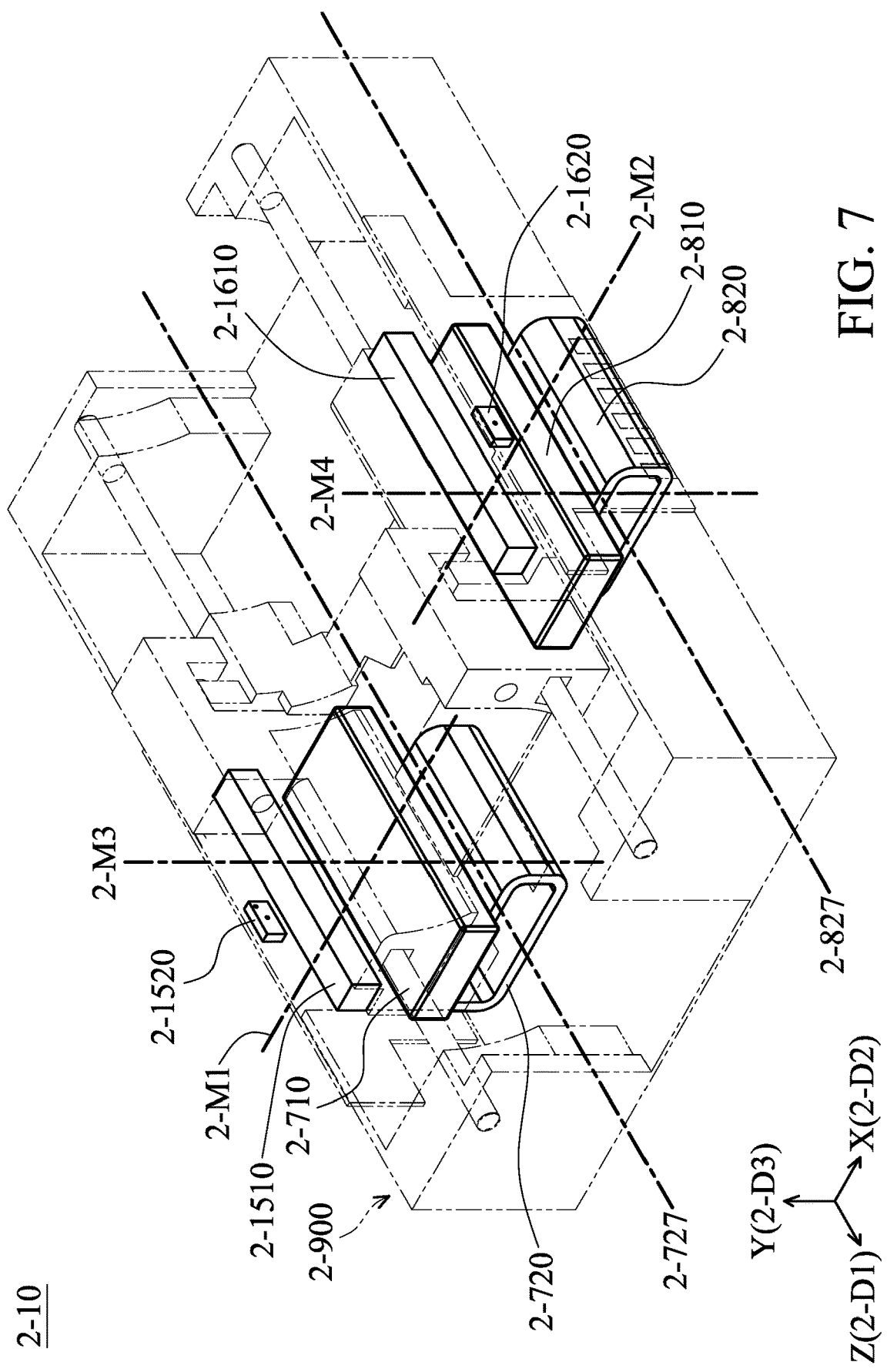
FIG. 7 is a perspective view of the optical system, according to some embodiments of the present disclosure, wherein the first optical element and the second optical element are omitted.

Next, referring to FIG. 6 and FIG. 7, FIG. 6 is a schematic view of the structures of the first reference magnetic element 2-1510 and the second reference magnetic element 2-1610, according to some embodiments of the present disclosure. FIG. 7 is a perspective view of the optical system 2-10, according to some embodiments of the present disclosure, wherein the first optical element 2-100 and the second optical element 2-200 are omitted. In some embodiments, the first sensing assembly 2-1500 includes a first reference magnetic element 2-1510 and a first sensor 2-1520. In some embodiments, the first reference magnetic element 2-1510 is fixedly disposed at the first movable portion 2-300. For example, the first reference magnetic element 2-1510 is disposed on the first holder 2-310. As shown in FIG. 6, the first reference magnetic element 2-1510 includes a plurality of first magnetic pole pairs 2-1515 that have N poles and S poles. Each of the first magnetic pole pairs 2-1515 includes a pair of magnetic poles consisting of an N pole and an S pole. The plurality of the first magnetic pole pairs 2-1515 are arranged in the first direction 2-D1. In each of the first magnetic pole pairs 2-1515, the N pole and the S pole are arranged in a first magnetic pole direction 2-M1. In this embodiment, the first magnetic pole direction 2-M1 is perpendicular to the first direction 2-D1. In some embodiments, the first sensor 2-1520 is fixedly disposed at the fixed portion 2-900, and corresponds to the first reference magnetic element 2-1510. When viewed in the first magnetic pole direction 2-M1, the first reference magnetic element 2-1510 and the first sensor 2-1520 at least partially overlap. In addition, in some embodiments, the largest size of the first reference magnetic element 2-1510 in the first direction 2-D1 is smaller than the largest size of the first magnetic element 2-710 in the first direction 2-D1.

Similarly, in some embodiments, the second sensing assembly 2-1600 includes a second reference magnetic element 2-1610 and a second sensor 2-1620. In some embodiments, the second reference magnetic element 2-1610 is fixedly disposed at the second movable portion 2-400. For example, the second reference magnetic element 2-1610 is disposed on the second holder 2-410. As shown in FIG. 6, the second reference magnetic element 2-1610 includes a plurality of second magnetic pole pairs 2-1615 that have N poles and S poles. Each of the second magnetic pole pairs 2-1615 includes a pair of magnetic poles consisting of an N pole and an S pole. The plurality of the second magnetic pole pairs 2-1615 are arranged in the first direction 2-D1. In each of the second magnetic pole pairs 2-1615, the N pole and the S pole are arranged in a second magnetic pole direction 2-M2. In this embodiment, the second magnetic pole direction 2-M2 is perpendicular to the first direction 2-D1. In some embodiments, the second sensor 2-1620 is fixedly disposed at the fixed portion 2-900, and corresponds to the second reference magnetic element 2-1610. When viewed in the second magnetic pole direction 2-M2, the second reference magnetic element 2-1610 and the second sensor 2-1620 at least partially overlap. In addition, in some embodiments, the largest size of the second reference magnetic element 2-1610 in the first direction 2-D1 is smaller than the largest size of the second magnetic element 2-810 in the first direction 2-D1.

In some embodiments, the first magnetic pole direction 2-M1 is parallel to the second magnetic pole direction 2-M2. In some embodiments, the first magnetic element 2-710 includes a pair of magnetic poles consisting of an N pole and an S pole, which are arranged in a third magnetic pole direction 2-M3. The second magnetic element 2-810 includes a pair of magnetic poles consisting of an N pole and an S pole, which are arranged in a fourth magnetic pole direction 2-M4. In some embodiments, the third magnetic pole direction 2-M3 is parallel to the fourth magnetic pole direction 2-M4. In some embodiments, the first magnetic pole direction 2-M1 is not parallel to the third magnetic pole direction 2-M3. In some embodiments, the first magnetic pole direction 2-M1 is not parallel to the fourth magnetic pole direction 2-M4. In some embodiments, the second magnetic pole direction 2-M2 is not parallel to the third magnetic pole direction 2-M3. In some embodiments, the second magnetic pole direction 2-M2 is not parallel to the fourth magnetic pole direction 2-M4. In some specific embodiments, the first magnetic pole direction 2-M1 is perpendicular to the third magnetic pole direction 2-M3, and the second magnetic pole direction 2-M2 is perpendicular to the fourth magnetic pole direction 2-M4, to prevent the magnetic interferences between the driving assemblies and the sensing assemblies. In addition, when viewed in the second direction 2-D2 (the view angle of FIG. 5), the first reference magnetic element 2-1510 and the second reference magnetic element 2-1610 at least partially overlap, and the first sensor 2-1520 and the second sensor 2-1620 do not overlap.

Figure 8:
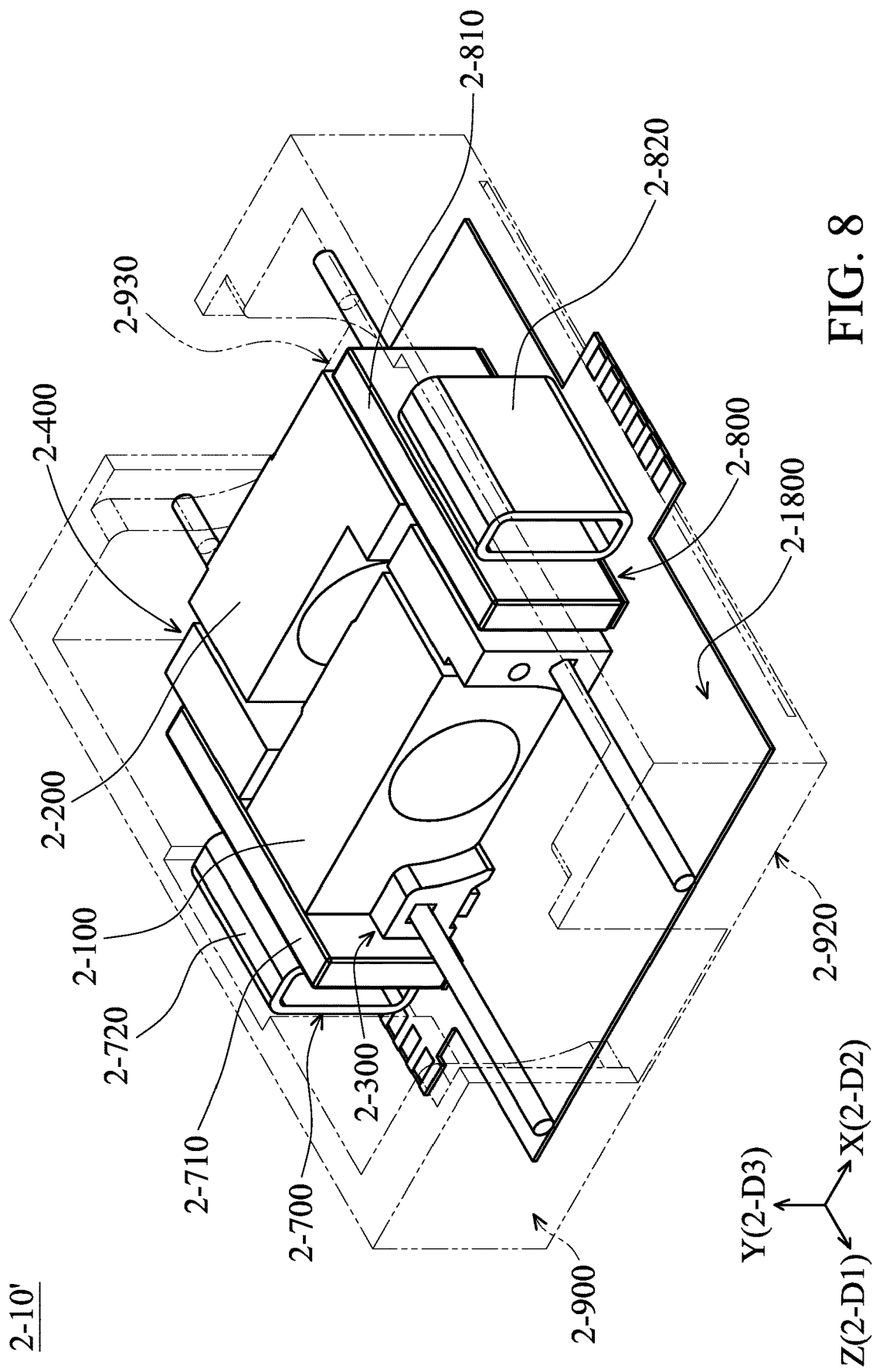
FIG. 8 is a perspective view of the optical system, according to some other embodiments of the present disclosure.
Figure 9:
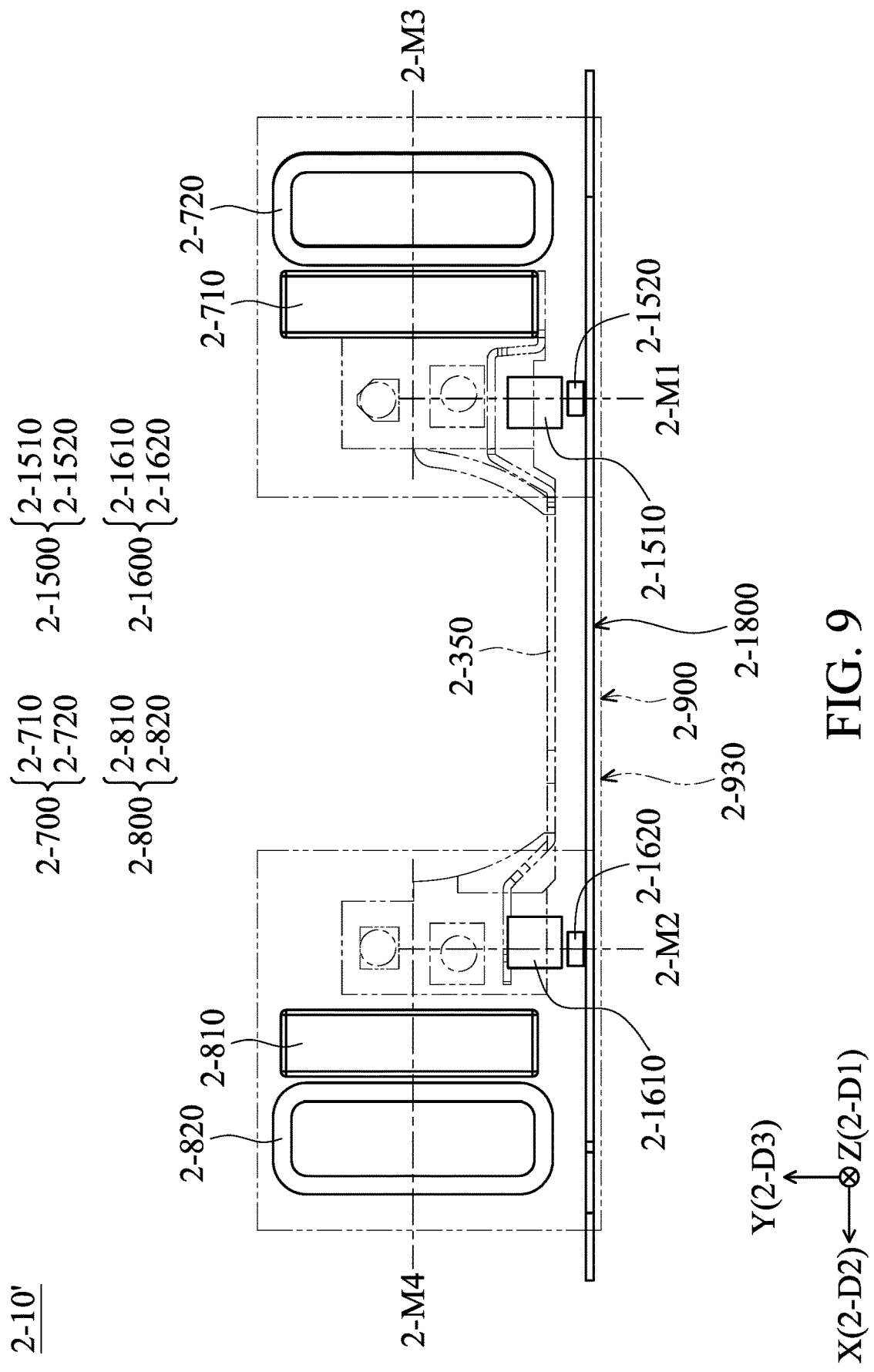
FIG. 9 is a right side view of the optical system, according to some other embodiments of the present disclosure, wherein the first optical element and the second optical element are omitted.

Next, referring to FIG. 8 and FIG. 9, FIG. 8 is a perspective view of the optical system 2-10', according to some other embodiments of the present disclosure. FIG. 9 is a right side view of the optical system 2-10', according to some other embodiments of the present disclosure, wherein the first optical element 2-100 and the second optical element 2-200 are omitted. In FIG. 8 and FIG. 9, each of the elements of the optical system 2-10' has the same or similar functions and structures as the elements of the optical system 2-10. The difference between them is that the elements may be positioned differently. Therefore, like reference numerals are used in the figures to represent the same or similar elements, and the detailed descriptions of these elements are not repeated.

As shown in FIG. 8 and FIG. 9, the optical system 2-10', similar to the optical system 2-10, includes a first optical element 2-100, a second optical element 2-200, a first movable portion 2-300, a second movable portion 2-400, a first driving assembly 2-700, a second driving assembly 2-800, a first sensing assembly 2-1500, a second sensing assembly 2-1600, and a circuit assembly 2-1800. However, in the optical system 2-10', as shown in FIG. 9, the first magnetic element 2-710 of the first driving assembly 2-700 is fixedly disposed on the side of the first movable portion 2-300 in the second direction 2-D2, so that the third magnetic pole direction 2-M3 of the first magnetic element 2-710 is parallel to the second direction 2-D2. Accordingly, the first coil 2-720 is disposed on the fixed portion 2-900, where the extending direction of the first axis 2-727 is still parallel to the first direction 2-D1. Similarly, the second magnetic element 2-810 of the second driving assembly 2-800 is fixedly disposed on the side of the second movable portion 2-400 in the second direction 2-D2, so that the fourth magnetic pole direction 2-M4 of the second magnetic element 2-810 is parallel to the second direction 2-D2. Accordingly, the second coil 2-820 is disposed on the fixed portion 2-900, where the extending direction of the second axis 2-827 is still parallel to the first direction 2-D1.

In some embodiments, when viewed in the second direction 2-D2, the first driving assembly 2-700 and the second driving assembly 2-800 at least partially overlap. For example, the first magnetic element 2-710 and the second magnetic element 2-810 at least partially overlap. Alternatively, the first coil 2-720 and the second coil 2-820 at least partially overlap. In addition, as shown in FIG. 9, when viewed in the first direction 2-D1, the first magnetic element 2-710 and the first coil 2-720 do not overlap, and the second magnetic element 2-810 and the second coil 2-820 do not overlap.

In the optical system 2-10', the first reference magnetic element 2-1510 of the first sensing assembly 2-1500 is fixedly disposed at the first movable portion 2-300. For example, the first reference magnetic element 2-1510 is on the surface that is on the opposite side from the first adherent surface 2-315 on the first holder 2-310. As described above with regard to FIG. 6, the first reference magnetic element 2-1510 has a plurality of first magnetic pole pairs 2-1515. In this embodiment, the first magnetic pole pairs 2-1515 are also arranged in the first direction 2-D1. Also, the first magnetic pole direction 2-M1 is perpendicular to the first direction 2-D1. However, it should be noted that the first magnetic pole direction 2-M1 of the optical system 2-10 is parallel to the second direction 2-D2, while the first magnetic pole direction 2-M1 of the optical system 2-10' is parallel to the third direction 2-D3. Accordingly, the first sensor 2-1520 is fixedly disposed at the fixed portion 2-900, and corresponds to the first reference magnetic element 2-1510. When viewed in the first magnetic pole direction 2-M1, the first reference magnetic element 2-1510 and the first sensor 2-1520 at least partially overlap.

Similarly, in the optical system 2-10', the second reference magnetic element 2-1610 of the second sensing assembly 2-1600 is fixedly disposed at the second movable portion 2-400. For example, the second reference magnetic element 2-1610 is on the surface that is on the opposite side from the third adherent surface 2-415 on the second holder 2-410. As described above with regard to FIG. 6, the second reference magnetic element 2-1610 has a plurality of second magnetic pole pairs 2-1615. In this embodiment, the second magnetic pole pairs 2-1615 are also arranged in the first direction 2-D1. Also, the second magnetic pole direction 2-M2 is perpendicular to the first direction 2-D1. However, it should be noted that the second magnetic pole direction 2-M2 of the optical system 2-10 is parallel to the second direction 2-D2, while the second magnetic pole direction 2-M2 of the optical system 2-10' is parallel to the third direction 2-D3. Accordingly, the second sensor 2-1620 is fixedly disposed at the fixed portion 2-900, and corresponds to the second reference magnetic element 2-1610. When viewed in the second magnetic pole direction 2-M2, the second reference magnetic element 2-1610 and the second sensor 2-1620 at least partially overlap.

In the embodiment shown in FIG. 9, the first magnetic pole direction 2-M1 is parallel to the second magnetic pole direction 2-M2, and the third magnetic pole direction 2-M3 is parallel to the fourth magnetic pole direction 2-M4. To prevent the magnetic interferences between the driving assemblies and the sensing assemblies, the first magnetic pole direction 2-M1 is perpendicular to the third magnetic pole direction 2-M3, and the second magnetic pole direction 2-M2 is perpendicular to the fourth magnetic pole direction 2-M4.

Figure 10:
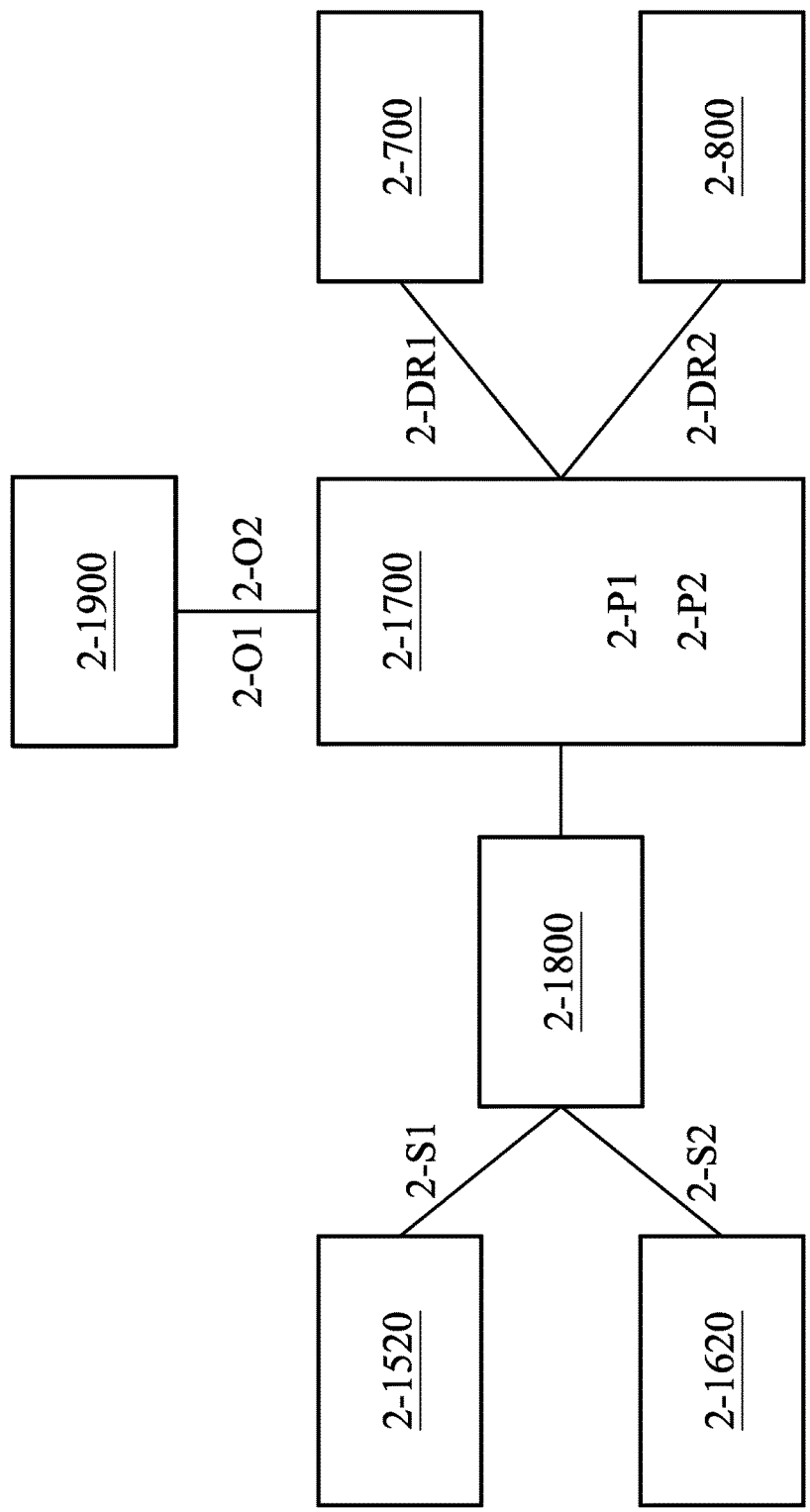
FIG. 10 is a schematic view of the connection of the control unit of the optical system, according to some embodiments of the present disclosure.

Next, referring to FIG. 10, FIG. 10 is a schematic view of the connection of the control unit 2-1700 of the optical system 2-10, according to some embodiments of the present disclosure. In some embodiments, the optical system 2-10 (or the optical system 2-10') further includes a control unit 2-1700. The control unit 2-1700 has first predetermined information 2-P1 and second predetermined information 2-P2. The first predetermined information 2-P1 includes the status of a first magnetic field of the first reference magnetic element 2-1510 for each possible location of the first movable portion 2-300 relative to the fixed portion 2-900. The second predetermined information 2-P2 includes the status of a second magnetic field of the second reference magnetic element 2-1610 for each possible location of the second movable portion 2-400 relative to the fixed portion 2-900. The control unit 2-1700 is electrically connected to the first sensor 2-1520 and the second sensor 2-1620 via the circuit assembly 2-1800. The first sensor 2-1520 outputs a first sensing signal 2-S1 to the control unit 2-1700, and the second sensor 2-1620 outputs a second sensing signal 2-S2 to the control unit 2-1700. After the control unit 2-1700 receives the first sensing signal 2-S1 and the second sensing signal 2-S2, it may calculate the position of the first movable portion 2-300 relative to the fixed portion 2-900 based on the first sensing signal 2-S1 and the first predetermined information 2-P1, and calculate the position of the second movable portion 2-400 relative to the fixed portion 2-900 based on the second sensing signal 2-S2 and the second predetermined information 2-P2.

Based on the calculated position(s) of the first movable portion 2-300 and/or the second movable portion 2-400, an external controller 2-1900 may output a first instruction 2-01 and/or a second instruction 2-02 to the control unit 2-1700. The control unit 2-1700 may output a first driving signal 2-DR1 to the first driving assembly 2-700 based on the first instruction 2-01, driving the first movable portion 2-300 to move. In some embodiments, the movement of the first movable portion 2-300 may change the focal length of the optical unit (e.g. including the first optical element 2-100, the second optical element 2-200, and the first movable portion 2-300), so that the optical system 2-10 performs the function of zooming. The control unit 2-1700 may output a second driving signal 2-DR2 to the second driving assembly 2-800 based on the second instruction 2-02, driving the second movable portion 2-400 to move. In some embodiments, the movement of the second movable portion 2-400 may change the image plane of the optical unit, so that the optical system 2-10 performs the function of focusing.

In some embodiments, first, the control unit 2-1700 outputs the first driving signal 2-DR1 to the first driving assembly 2-700. After the first driving assembly 2-700 drives the first movable portion 2-300 to move, and after the first movable portion 2-300 arrives at its desired position, the control unit 2-1700 then outputs the second driving signal 2-DR2 to the second driving assembly 2-800, so that the second driving assembly 2-800 drives the second movable portion 2-400 to move to its desired position. In other words, the control unit 2-1700 may control the optical system 2-10 to perform zooming before focusing. This precise control of positions may achieve better optical effects.

In summary, the optical system 2-10 of the present disclosure includes a plurality of optical elements (e.g. the first optical element 2-100 and the second optical element 2-200). A plurality of driving assemblies (e.g. the first driving assembly 2-700 and the second driving assembly 2-800) are used to drive the optical elements to move relative to the fixed portion 2-900 and/or relative to each other, achieving effects of optical zooming or optical focusing, or the like. A plurality of sensing assemblies (e.g. the first sensing assembly 2-1500 and the second sensing assembly 2-1600) are used to precisely control the positions of the optical elements. Additionally, according to the configurations for the driving assemblies and the sensing assemblies, the interference generated by the magnetic fields of the magnetic elements thereof may be prevented. This improves the optical quality and stability of the optical system by maintaining good driving effects and sensing effects. Further, two different configurations of optical system 2-10 and optical system 2-10' are provided, which is helpful to improve the compatibility and usability of the overall mechanism.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:
1. An optical system, comprising:
 a first movable portion connected to a first optical element;
 a fixed portion, wherein the first movable portion is movable relative to the fixed portion;

a first driving assembly driving the first movable portion to move relative to the fixed portion;
a circuit assembly electrically connected to the first driving assembly;
a second movable portion; and
a second driving assembly driving the second movable portion to move relative to the fixed portion;
wherein the first movable portion comprises:
a first holder with a plastic material, corresponding to the first driving assembly:
a first guiding portion with a plastic material, wherein the second movable portion is movable relative to the first movable portion through the first guiding portion; and
a first connecting portion with a metal material, wherein the first holder is fixedly connected to the first guiding portion via the first connecting portion;
wherein the second movable portion comprises:
a second holder with a plastic material, corresponding to the second driving assembly;
a second guiding portion with a plastic material, wherein the second movable portion is movable relative to the first movable portion through the second guiding portion; and
a second connecting portion with a metal material, wherein the second holder is fixedly connected to the second guiding portion via the second connecting portion.

2. The optical system as claimed in claim 1, wherein:
the second movable portion is connected to a second optical element, and the first movable portion and the second movable portion are arranged in a first direction.

3. The optical system as claimed in claim 2,
wherein the first movable portion is movable within a first range of motion relative to the fixed portion;
wherein the second movable portion is movable within a second range of motion relative to the fixed portion, wherein the second range of motion is different from the first range of motion; and
wherein the second movable portion is movable within a third range of motion relative to the first movable portion.

4. The optical system as claimed in claim 1,
wherein the first connecting portion is at least partially embedded in the first holder and at least partially embedded in the first guiding portion; and
wherein the second connecting portion is at least partially embedded in the second holder and at least partially embedded in the second guiding portion.

5. The optical system as claimed in claim 1,
wherein the first optical element is fixedly connected to the first holder via a first adhesive, and is fixedly connected to the first guiding portion via a second adhesive; and
wherein the second optical element is fixedly connected to the second holder via a third adhesive, and is fixedly connected to the second guiding portion via a fourth adhesive.

6. The optical system as claimed in claim 1, wherein when viewed in the first direction, the first holder at least partially overlaps the second guiding portion, and the second holder at least partially overlaps the first guiding portion.

7. The optical system as claimed in claim 1, wherein the first driving assembly is at least partially disposed at the first holder, and the first driving assembly
a first magnetic element fixedly disposed on the first holder; and a first coil, corresponding to the first magnetic element, and disposed on the fixed portion, wherein a first axis of the first coil is parallel to the first direction;
wherein the second driving assembly is at least partially disposed at the second holder, and the second driving assembly comprises:
a second magnetic element fixedly disposed on the second holder; and
a second coil, corresponding to the second magnetic element, and disposed on the fixed portion, wherein a second axis of the second coil is parallel to the first direction.

8. The optical system as claimed in claim 7, wherein when viewed in a second direction that is perpendicular to the first direction, the first driving assembly at least partially overlaps the second driving assembly.

9. The optical system as claimed in claim 8, wherein when viewed in a third direction that is perpendicular to the first direction and the second direction, a center of the first magnetic element and a center of the second magnetic element form a first line, and the first line is neither parallel nor perpendicular to the first direction; and
a center of the first coil and a center of the second coil form a second line, and the second line is neither parallel nor perpendicular to the first direction.

10. The optical system as claimed in claim 7, further comprising:
a first sensing assembly sensing the movement of the first movable portion relative to the fixed portion, comprising:
a first reference magnetic element, including a plurality of first magnetic pole pairs that have N poles and S poles, wherein the first magnetic pole pairs are arranged in the first direction, and in each of the first magnetic pole pairs, an N pole and an S pole are arranged in a first magnetic pole direction, wherein the first magnetic pole direction is perpendicular to the first direction; and
a first sensor corresponding to the first reference magnetic element; and
a second sensing assembly sensing the movement of the second movable portion relative to the fixed portion, comprising:
a second reference magnetic element, including a plurality of second magnetic pole pairs that have N poles and S poles, wherein the second magnetic pole pairs are arranged in the first direction, and in each of the second magnetic pole pairs, an N pole and an S pole are arranged in a second magnetic pole direction, wherein the second magnetic pole direction is perpendicular to the first direction; and
a second sensor corresponding to the second reference magnetic element.

11. The optical system as claimed in claim 10, wherein:
when viewed in the first magnetic pole direction, the first reference magnetic element at least partially overlaps the first sensor; and
when viewed in the second magnetic pole direction, the second reference magnetic element at least partially overlaps the second sensor.

12. The optical system as claimed in claim 10, wherein the first magnetic pole direction is parallel to the second magnetic pole direction.

13. The optical system as claimed in claim 12, wherein a third magnetic pole direction of the first magnetic element is parallel to a fourth magnetic pole direction of the second magnetic element.

14. The optical system as claimed in claim 13, wherein:
the first magnetic pole direction is not parallel to the third magnetic pole direction;
the first magnetic pole direction is not parallel to the fourth magnetic pole direction;
the second magnetic pole direction is not parallel to the third magnetic pole direction; and
the second magnetic pole direction is not parallel to the fourth magnetic pole direction.

15. The optical system as claimed in claim 14, wherein:
the first magnetic pole direction is perpendicular to the third magnetic pole direction;
the first magnetic pole direction is perpendicular to the fourth magnetic pole direction;
the second magnetic pole direction is perpendicular to the third magnetic pole direction; and
the second magnetic pole direction is perpendicular to the fourth magnetic pole direction.

16. The optical system as claimed in claim 10, further comprising a control unit, wherein the control unit has first predetermined information and second predetermined information;
wherein the first predetermined information includes the status of a first magnetic field of the first reference magnetic element for each possible location of the first movable portion relative to the fixed portion;
wherein the second predetermined information includes the status of a second magnetic field of the second reference magnetic element for each possible location of the second movable portion relative to the fixed portion; and
wherein the control unit is electrically connected to the first sensor and the second sensor via the circuit assembly, wherein the first sensor outputs a first sensing signal to the control unit, and the second sensor outputs a second sensing signal to the control unit.

17. The optical system as claimed in claim 16, wherein the control unit calculates the position of the first movable portion relative to the fixed portion based on the first sensing signal and the first predetermined information, and calculates the position of the second movable portion relative to the fixed portion based on the second sensing signal and the second predetermined information.

18. The optical system as claimed in claim 16, further comprising a third optical element, fixedly disposed at the fixed portion, and forms an optical unit with the first optical element and the second optical element;
wherein the control unit outputs a first driving signal to the first driving assembly based on a first instruction, and the first driving assembly drives the first movable portion to move, and changes the focal length of the optical unit, thereby performing the function of zooming; and
wherein the control unit outputs a second driving signal to the second driving assembly based on a second instruction, and the second driving assembly drives the second movable portion to move, and changes the image plane of the optical unit, thereby performing the function of focusing.

19. The optical system as claimed in claim 18, wherein the control unit outputs the first driving signal to the first driving assembly that drives the first movable portion to move before the control unit outputs the second driving signal to the second driving assembly that drives the second movable portion to move, so that the optical system performs the function of zooming before performing the function of focusing.

* * * * *